United States Patent [19]
Hurd

[11] Patent Number: 4,850,771
[45] Date of Patent: Jul. 25, 1989

[54] INSTALLATION SYSTEM FOR SECURING WORKPIECES OF COMPOSITE MATERIALS AND THE LIKE AND THREADED FASTENER FOR SUCH SYSTEM

[76] Inventor: Ramon L. Hurd, 8857 Cardinal St., Fountain Valley, Calif. 92708

[21] Appl. No.: 196,881

[22] Filed: May 20, 1988

Related U.S. Application Data

[63] Continuation of Ser. No. 851,498, Apr. 1, 1986, abandoned.

[51] Int. Cl.$^4$ ............................................. F16B 37/04
[52] U.S. Cl. ......................................... 411/43; 29/523; 29/525; 29/525.1; 411/360; 411/367; 403/408.1
[58] Field of Search ........................ 411/39, 40, 36, 41, 411/43, 55, 367, 360, 361; 403/408; 29/240, 525.1, 523

[56] References Cited

U.S. PATENT DOCUMENTS

| | | | |
|---|---|---|---|
| 3,025,730 | 3/1962 | Brilmyer et al. | 29/240 |
| 3,596,948 | 8/1971 | Spoehr | 411/55 X |
| 3,641,865 | 2/1972 | Swindt et al. | 29/523 X |
| 3,835,615 | 9/1974 | King, Jr. | 29/526 R X |
| 3,915,052 | 10/1975 | Ruhl | 411/361 |
| 3,941,027 | 3/1976 | Gibson, Jr. et al. | 411/43 |
| 3,965,792 | 6/1976 | King, Jr. | 411/361 |
| 4,102,036 | 7/1978 | Salter | 411/367 |
| 4,405,256 | 9/1983 | King, Jr. | 411/360 X |
| 4,595,324 | 6/1986 | Sadri | 411/41 X |

Primary Examiner—Charlie T. Moon
Attorney, Agent, or Firm—Lawrence J. Shurupoff

[57] ABSTRACT

An installation system for securing workpieces of composite type materials and including a fastener adapted to be located in aligned bores in such workpieces with a preselected interference fit, with the fastener comprising a pin having an elongated shank, an enlarged head and enlarged diameter smooth shank section adjacent the pin head, and further having a threaded section extending from the smooth shank section to a breakneck groove located in the shank to define a frangible portion at its free end, the breakneck groove adapted to fracture at a preselected axial load of generally low magnitude, a thin gauged expansion sleeve having an inside diameter less than the diameter of the smooth shank section, the sleeve having an outside diameter permitting the assembly of the sleeve into the workpiece bores with a snug fit, the breakneck groove having an axial strength at least equal to the maximum axial load required to pull the pin member fully into the sleeve with the smooth pin shank section expanding the sleeve into the workpiece bores to provide the preselected interference fit, the breakneck groove having an axial strength no greater than a preselected low percentage greater than the axial load whereby the frangible portion of the shank can be severed at a minimal axial load applying a member to the frangible portion to pull the pin member into the sleeve and then severing the frangible portion separately from the final installation of the fastener.

4 Claims, 2 Drawing Sheets

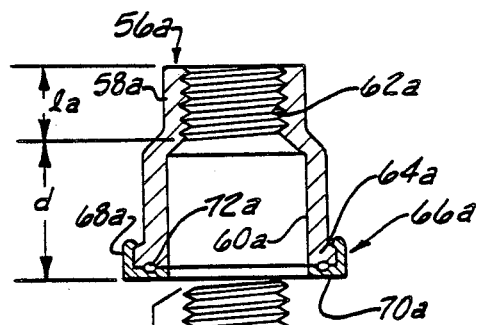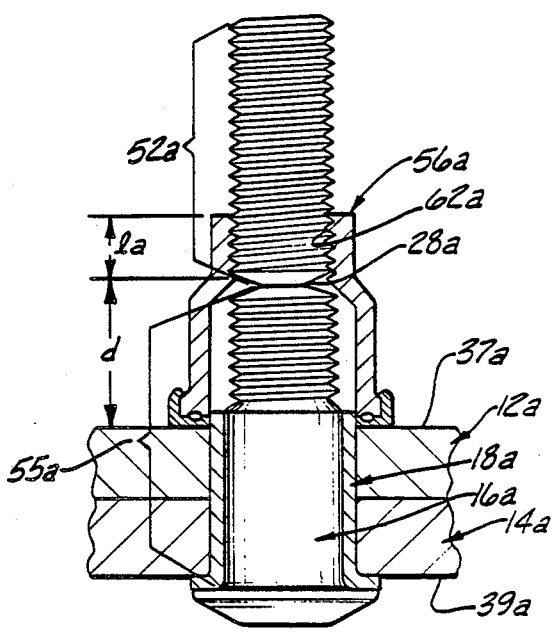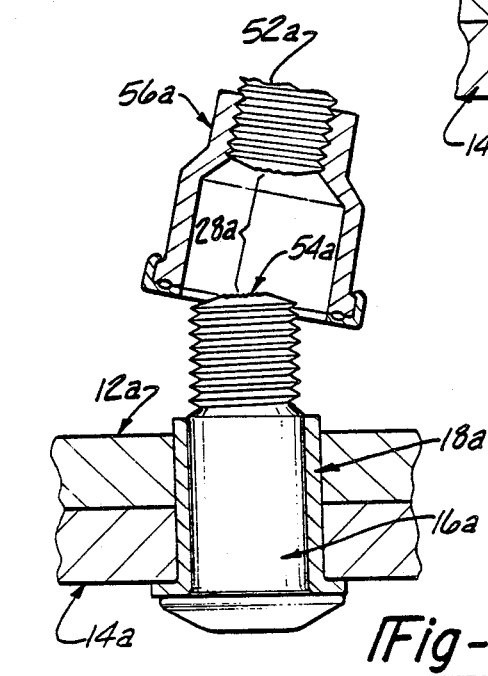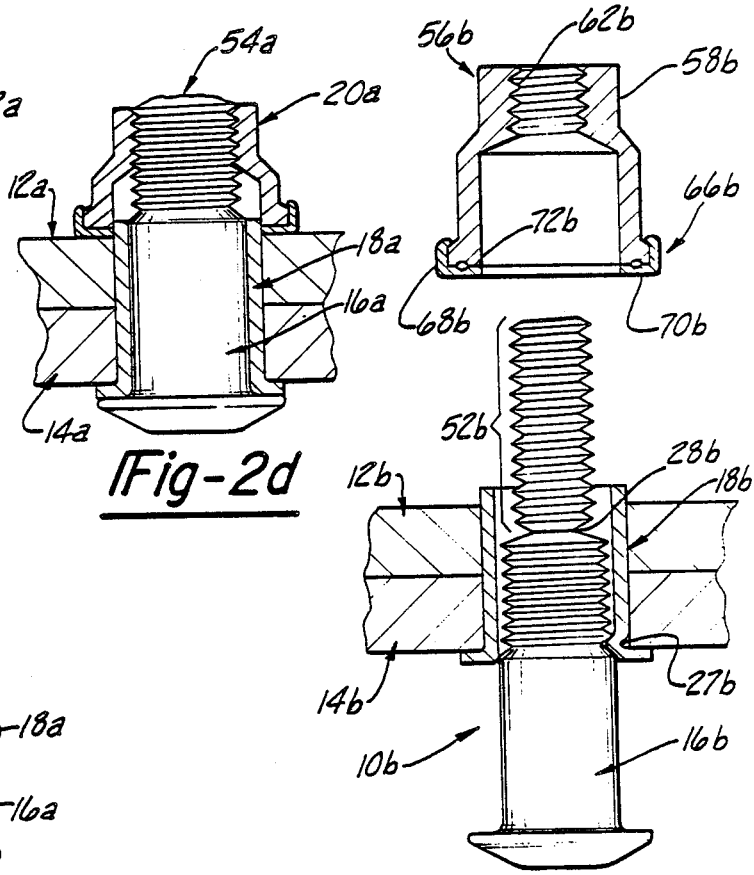

INSTALLATION SYSTEM FOR SECURING WORKPIECES OF COMPOSITE MATERIALS AND THE LIKE AND THREADED FASTENER FOR SUCH SYSTEM

This application is a continuation of application Ser. No. 851,498, filed Apr. 1, 1986, now abandoned.

BACKGROUND AND SUMMARY OF THE INVENTION

The present invention relates to an installation system for securing workpieces of composite materials and the like and to a threaded fastener therefor, including a pin and a nut for use in interference applications in such a system.

Many structures are fastened together with swage type fasteners of a lock bolt type, including a pin and a collar, such as shown in U.S. Pat. Nos. 2,531,048 issued to L. C. Huck, on Nov. 21, 1950 for "Fastening Device", RE. 30,445 issued to John H. Ruhl on Dec. 16, 1980 for "Fastener With Proportioned Strength Lock Grooves", and U.S. Pat. No. 4,472,096 issued to John Ruhl and Richard D. Dixon on Sept. 18, 1984 for "Optimized Fastener Construction System and Method". Often these fasteners are installed with a preselected desired interference with the openings in the workpieces. Frequently when such structures are repaired, some of the existing fasteners are removed. The process of removing the fasteners and in preparing the fastener openings in the repaired structure results in the openings being made slightly oversized in contrast to their original size. In fastening the repaired structure, in some instances, it is desirable to use fasteners with pins of the same diameter as those originally used. At the same time, it is desirable that the repair fastener provide the desired interference with the workpiece opening. However, in order to compensate for the larger opening, the pin of the repair fastener can be used with a thin gauged sleeve whereby the difference in diameter between the pin and enlarged opening can be accommodated while providing the desired interference.

It should be understood, however, that the present invention is not limited to repair applications.

In the present invention a fastener assembly including a threaded pin and thin gauge sleeve is used with a threaded nut member. The sleeve is dimensioned to be received with a slight clearance in the workpiece openings and is expanded to the desired interference by the pin as the pin is moved axially through the sleeve to its installed position.

In one form of the invention the axial movement of the pin is effected through a threaded connection by a nut member with the pin. As can be seen from the drawings and the description of the various embodiments, the pin of necessity will have an excess length of threaded shank after installation. In order to eliminate the excess shank length and the resulting excess weight and protrusion, the threaded shank is provided with a breakneck groove or weakened portion at which the excess pin shank portion can be severed with a relatively low bending force or axial load.

In another form of the invention, the axial movement is effected by a pull type tool which exerts the required axial force between the pin and the sleeve to cause the relative axial movement and resultant sleeve expansion. In any of the various forms of the present invention, the final joint can be secured by a nut member threaded onto the pin shank.

The fastener and method of installation are especially desirable for use with workpieces constructed of crushable materials such as composites or the like. In addition the fastener and method of installation are also desirable in applications where clearance is limited, precluding the use of conventional installation tools.

Therefore it is an object of the present invention to provide a multipieced fastener for securing workpieces via openings therein and a method of installation of such fastener for creating a preselected interference with such workpiece openings.

It is another object of the present invention to provide a fastener for securing workpieces via openings therein with the fastener including a pin, a sleeve and a nut with the pin having a frangible shank portion which can be readily broken away after installation, and a method of installation of such fastener for creating a preselected interference with the workpiece openings.

It is still another object of the present invention to provide a fastener for securing workpieces via openings therein with the fastener including a threaded pin, a sleeve and a threaded nut with the pin adapted to be pulled into the sleeve to create a desired interference with the workpiece openings and a method of installation of such fastener for providing the preselected interference with the workpiece openings.

It is another object of the present invention to provide a multipieced fastener for securing workpieces via openings therein where such workpieces are constructed of crushable materials such as composites or the like, and a method of installation of such fastener for creating a preselected interference with the openings in such workpieces.

It is another object to provide a fastener for securing workpieces via openings therein and method of installation for creating a preselected interference with such openings in workpieces where the clearance around such openings is limited.

Other objects, features, and advantages of the present invention will become apparent from the subsequent description and the appended claims, taken in conjunction with the accompanying drawings.

BRIEF DESCRIPTION OF THE DRAWINGS

FIGS. 1a, 1b and 1c are elevational views with some parts shown in section and depicting the sequence of installation steps of one form of fastener of the present invention including a pin, a sleeve and a nut in which:

FIG. 1a shows the pin and sleeve preassembled and located in openings in workpieces to be joined with a nut member shown prior to installation;

FIG. 1b shows the fastener after the nut member has been secured to the pin and the pin pulled through the sleeve in the workpiece openings; and FIG. 1c shows the fastener after an excess portion of the pin shank has been severed.

FIGS. 2a, 2b, 2c and 2d are elevational views with some parts shown in section and depicting the fastener of FIGS. 1a–1c but installed via a different sequence of installation steps in which:

FIG. 2a shows the fastener pin and sleeve preassembled and located in openings in workpieces to be joined with a free running nut to be used as a removable installation tool;

FIG. 2b shows the pin and the sleeve installed in the workpiece openings via the free running nut tool;

FIG. 2c shows the excess portion of the pin shank having been severed via the free running nut tool; and FIG. 2d shows the pin and sleeve finally installed with a fastener nut member.

FIG. 4 is an elevational view similar to that of FIG. 2a showing a modified form of the fastener and free running nut tool of FIGS. 2a–2d.

DESCRIPTION OF THE PREFERRED EMBODIMENT

Figure 1A:
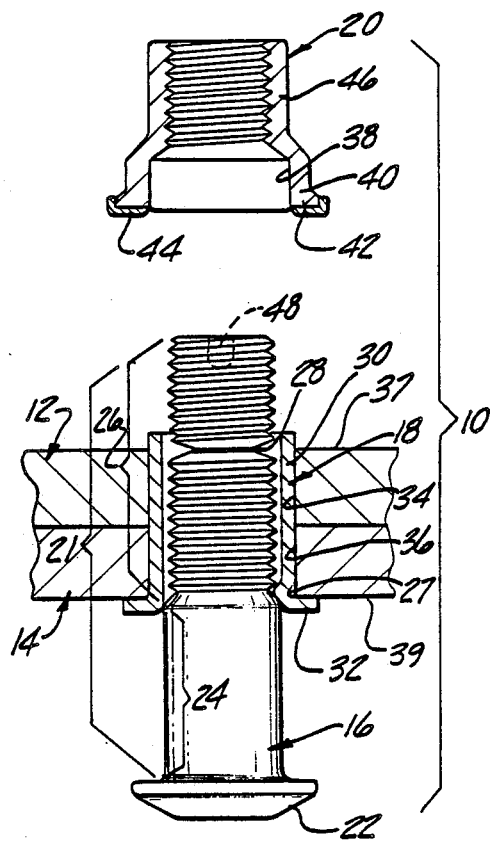
Figure 1B:
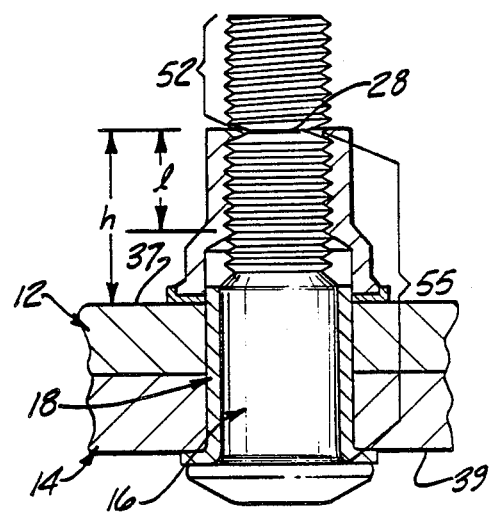
Figure 1C:
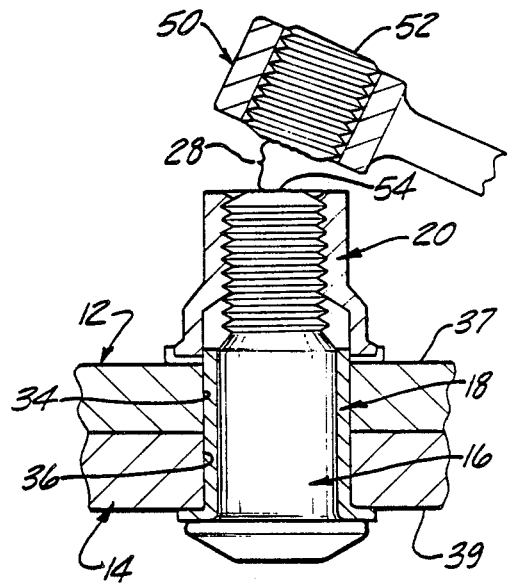

Looking now to FIGS. 1a–1c a fastener 10 is shown for fastening workpieces 12 and 14 and includes a pin 16, an expansion sleeve 18 and a nut member 20. The fastener 10 is particularly useful where the workpieces 12 and 14 are constructed of crushable materials such as composites, or the like. The composite materials for example can be of a graphite-epoxy composite structure, an aramid fiber reinforced composite structure, or the like. One such aramid fiber reinforced composite structure is produced and sold by E. I. du Pont de Nemours & Co., Inc. under its trademark KEVLAR.

The pin 16 includes an elongated shank 21 which terminates at one end in an enlarged head 22. The shank 21 includes an enlarged smooth shank section 24 adjacent the head 22 and a threaded section 26 at the opposite end of the pin 16. The threaded section 26 is generally uniformly threaded over its length except for an annular reduced diameter breakneck groove 28. The breakneck groove section 28 is the weakest portion of the pin 16 and is selected to fracture at a desired axial or bending load in a manner to be described.

The threaded section 26 has a maximum diameter which is less than the diameter of the smooth shank section 24.

The expansion sleeve 18 has a generally uniform tubular portion 30 which terminates in an annular flange 32. The sleeve 18 has an internal diameter great enough to move readily over the threaded section 26 but less than the diameter of the smooth pin shank section 24. After preassembly on the pin 16, the sleeve 18 can be partially crimped into the threaded section 26 as at 27 in order to hold the pin 16 and sleeve 18 together thereby facilitating handling. The sleeve 18 can generally be of a type shown and described in the U.S. Pat. No. 3,835,615 issued on Sept. 17, 1974 to John O. King, Jr.

The workpieces 12 and 14 are provided with aligned bores 34 and 36, respectively, which, as noted, after a repair operation, have been enlarged. The outside diameter of the sleeve tubular portion 30, in its pre-expanded condition, and the diameter of bores 34 and 36 are selected to provide a snug fit when the tubular portion 30 is located within bores 34 and 36 as shown in FIG. 1a. The desired interference fit with the workpiece bores 34 and 36 will be provided by the radial expansion of the sleeve 18 by the smooth pin shank portion 24. In this manner, the sleeve 18 by shielding the surfaces of bores 34 and 36 from the pin shank portion will inhibit delamination of the composite materials as the pin shank portion 24 is pulled into the sleeve 18 to radially expand to the desired interference fit with the bores 34 and 36.

The fastener 10, with a pin 16 having a shank 21 of a predetermined length can be selected to fasten together workpieces 12 and 14 having a grip varying in total thickness from a minimum to a maximum total thickness. Since it is desirable to have the sleeve tubular portion 30 cover or shield the surfaces of bores 34 and 36 over the entire grip range, the tubular portion 30 for workpiece thicknesses less than the maximum total thickness, will protrude beyond the outer surface 37 of the workpiece 12. In order to accommodate this condition the nut 20 is provided with an enlarged counterbore 38 having a diameter slightly larger than the outside diameter of the sleeve tubular portion 30 and which has an axial depth sufficient to accept the maximum protrusion of the sleeve tubular portion 30. The counterbore 38 is formed in an enlarged, generally annular head portion 40 of the nut member 20. The head portion 40 terminates in an enlarger flange 42 which has a large bearing area preselected to provide adequate load distribution to inhibit localized delamination and/or crushing of the composite material of the outer surface 37 of workpiece 12. The nut member 20 is also provided with a facing washer 44 which is made of a material compatible with the composite material of workpiece 12 and which has good relative lubricity characteristics whereby the delamination noted is further inhibited. The opening through the facing washer 44 is of a diameter closely proximating the diameter of bore 34 of the engaged workpiece 12. Thus the facing washer 44 will support the surface surrounding the bore 34 to also further inhibit delamination as the pin shank portion 24 is pulled into the sleeve 18 to radially expand it as previously discussed.

The nut member 20 has a reduced diameter portion 46 which is internally threaded to threadably engage the threaded section 26 of the pin shank 21. The threaded nut section 46 has an irregular external surface adapted to be gripped by a wrench. In one form of the invention the nut member 20 was formed to have a prevailing torque characteristic.

To install the fastener 10, the pin 16 and sleeve 18, as preassembled thereto, are assembled in workpiece openings 34 and 36. A sufficient length of the pin threaded section 26 extends beyond the outer surface 37 of workpiece 12 such that the threaded nut section 46 can engage a suitable number of threads at the end of threaded pin section 26. As the nut member 20 is threaded onto the pin 16, the smooth pin shank section 24 will be pulled into the expansion sleeve 18 causing it to expand radially outwardly. The magnitude of this expansion is determined by the selection of the diameter of smooth pin shank portion 24 relative to the wall thickness of the sleeve tubular portion 30 and the diameters of workpiece bores 34 and 36. Note that the threaded pin section 26 is continuously threaded over its length and across the breakneck groove section 28 to permit the nut member 20 to be fully threaded across the threaded pin section 26.

Thus the nut member 20 is threaded onto the pin 16 until the movement of the smooth pin shank section 20 into the expansion sleeve 18 has been completed and the pin head 22 has engaged the sleeve flange 32 against the rear workpiece surface 39. At this point the nut member 20 is tightened to a preselected torque to provide the desired clamping force between workpieces 12 and 14. A hexagonal or other irregularly shaped bore 48 is located in the free end of the pin shank 21 and is adapted to receive a suitable tool to prevent rotation of the pin 16 as the nut member 20 is torqued onto the pin 16. It should be noted that other anti-rotation structures could be employed.

With the fastener 10 fully torqued, the breakneck groove section 28 will be located at or adjacent to the outer end of the nut member 20. Next a removal tool 50 is placed over that threaded end portion 52 which extends beyond the breakneck groove 28; with the application of a relatively low axial or bending force, the threaded end portion 52 will be broken away from the pin shank 21 at the breakneck groove section 28. This will leave the terminal end 54 of the pin shank 21 substantially flush with the outer end of the nut member 20. In order to assure this flush break condition, the axial length of the pin shank portion 55 from the pin head 22 to the breakneck groove section 28 is selected to be equal to the sum of the height "h" of the nut member 20, the maximum thickness of the workpieces 12 and 14 to be joined and the thickness of sleeve flange 32. The axial length of the frangible end portion 52 will be generally no greater than the axial length "1" of the threaded nut section 46 of nut member 20 and no less than around one half the axial length "1" of the threaded nut section 46. At the same time the axial length of the smooth pin shank portion 24 will be generally equal to the maximum total thickness of the workpieces 12 and 14 to be joined.

As noted the breakneck groove section 28 represents the weakest portion of the pin 16. It is desirable, however, that the breakneck groove section 28 fracture at a relatively low load to facilitate removal of the frangible pin shank end portion 52. At the same time the breakneck groove section 28 must have sufficient strength to accept the axial load applied by the nut member 20 as the pin 10 is initially pulled into the expansion sleeve 18 and the smooth pin shank section 24 radially expands that sleeve 18 to provide the desired interference fit with the workpiece bores 34 and 36. In one form of the invention the axial load at which the breakneck groove section 28 will fracture does not exceed a magnitude which is around twenty (20%) percent greater than the maximum axial load required to pull the pin shank section 24 into the sleeve 18 and to effect the desired radial expansion in the workpiece bores 34 and 36. Note that breakneck grooves section have been ordinarily used for swage type fasteners of the kind previously discussed. There the breakneck grooves sections were designed to accept an axial load greater than the final load desired to clamp the workpieces together. Here, however, the excess length resulting from the frangible threaded end portion 52 is provided only to permit gripping of the pin shank 21 so that the expansion of the sleeve 18 can be accomplished in the manner described. Thus here the breakneck groove section 28 is performing a singular, limited function which is different from that with swage type fasteners. Thus the breakneck groove section 28 of the present invention is selected to have a strength significantly less than the final desired clamp load for workpieces 12 and 14 i.e. the clamp load attained by the final application of the nut member 20 to the pin 16. In one form of the invention the tensile fracture load for breakneck groove section 28 was 50% of the final ultimate tensile load for the set fastener. It is desirable that the breakneck groove section 28 have a tensile load no greater than around 50% in order to facilitate the removal of that portion after pull in of the pin.

Thus with the fastener 10 as installed in composite workpieces 12 and 14 in the manner shown in FIGS. 1a–1c, an interference fit can be provided with workpiece bores 34 and 36. Note also that since installation is provided by the threaded construction described, this fastener 10 can be used in applications having limited clearance where such limited clearance would restrict access by conventional pull tools.

In one form of the invention for use with workpieces 12 and 14 of composite materials the pin 16 was constructed of 6A1-4V Titanium alloy at 160 KSI minimum ultimate tensile; the sleeve 18 was constructed of A286 corrosion resistant steel of 80 KSI minimum ultimate tensile; and the nut member 20 was constructed of mil-S-5000 4340 alloy steel at 160 KSI minimum ultimate tensile. For workpieces 12 and 14 having bores 34 and 36 with a nominal diameter of ¼" (0.2645") a pin 16 was selected to have a smooth shank section 24 with a nominal diameter of ¼" (0.252"). The sleeve 18 had a nominal wall thickness of 0.008" to provide a nominal interference of 0.003" with workpiece bores 34 and 36.

Figure 3:
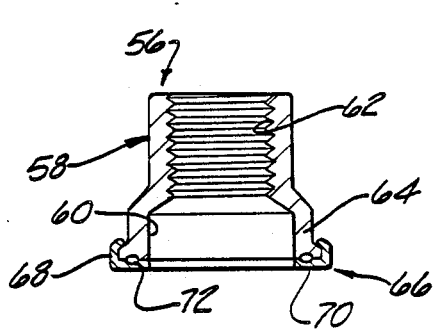
FIG. 3 is a sectional, elevational view showing a different form of removable, free running nut tool for installation of the fasteners of FIGS. 1a–1c and 2a–2d.

It may desirable to utilize a separate removable wrenching tool to pull the pin 16 into the sleeve 18. This can be accomplished via a free running nut tool 56 such as is shown in FIG. 3. The nut tool 56 can be of a configuration similar to that of the nut member 20 and as such has a nut body 58 with a counterbore 60 and an internally threaded section 62 having an irregular external surface adapted to be gripped by a suitable wrenching device. The counterbore 60 of the nut body 58 is formed in an enlarged annular head portion 64 which has rotatably fixed thereto a bearing washer assembly 66 having a cupped washer 68 terminating in a flat workpiece engaging surface 70. A bearing assembly 72 is located axially between the end of the head portion 64 of nut body 58 and the bearing washer 68 to facilitate relative rotation therebetween. As with the nut member 20, the opening through the support surface 70 is of a diameter closely proximating the diameter of bore 34 of workpiece 12 to provide the desired support to inhibit delamination when the pin 16 is pulled into the sleeve 18.

Thus for installation of a fastener such as fastener 10, the nut tool 56 is threaded onto the threaded pin shank section 26; the washer engaging surface 70 when in engagement with workpiece surface 37 will be inhibited from rotation by friction while the bearing assembly 72 will facilitate relative rotation of the nut body 58. Thus the pin 16 can be pulled into the sleeve 18 and the workpieces 12 and 14 pulled tightly together without marring the surface 37 by rotation of the nut body 58. After the pin 16 has been fully pulled into the expansion sleeve 18, the nut tool 56 can be readily removed and the nut member 20 applied. Rotation of the nut member 20 will be limited to the amount suffficient to provide the desired torque and hence clamp load between workpieces 12 and 14. With this accomplished the frangible threaded shank end portion 52 is removed via tool 50 in the manner previously noted. Of course, the nut tool 56 can be continuously reused.

Another form of the invention is shown in FIGS. 2a–2d; in the discussion of this embodiment components similar to like components in the embodiment of FIGS. 1a–1d and FIG. 3 have been given the name numeral designation with the addition of the letter postscript "a". For purposes of simplicity all such similar components have not been described again but are designated in the drawing of FIGS. 2a–2d.

Looking now to FIGS. 2a–2d fastener 10a is shown for fastening workpieces 12a and 14a.

To install the fastener 10a, the pin 16a and sleeve 18a, as preassembled thereto, as assembled in workpiece openings 34a and 36a. Again a sufficient length of the pin threaded section 26a extends beyond the outer surface 37a of workpiece 12a such that a suitable number of threads can be engaged at the end of threaded pin section 26a by a modified form of the free running nut tool of FIG. 3. Thus in FIGS. 2a-2c a modified free running tool 56a is shown. The nut tool 56a has a nut body 58a with a counterbore 60a and with an internally threaded section 62a having an irregular external surface adapted to be gripped by a suitable wrenching device. Here the counterbore 60a of the nut body 58a is formed in an enlarged annular head portion 64a which is substantially elongated for a purpose to be described. Rotatably fixed to the end of the head portion 64a is a bearing washer assembly 66a having a cupped washer 68a terminating in a flat workpiece engaging and support surface 70a. A bearing assembly 72a is located axially between the end of the head portion 64a and the bearing washer 68a to facilitate relative rotation therebetween. The support surface 70a is configured similarly to surface 70 to inhibit delamination noted.

In this embodiment the frangible pin shank portion 52a will be severed by the axial load applied by the installation nut tool 56a. However, to accomplish this, the internally threaded section 62a of nut body 58a must be spaced a sufficient distance from the engaged workpiece surface 37a such that it will not threadably engage the threaded portion of threaded shank section 26a on the pin head side of the breakneck groove section 28a. Thus now the enlarged head portion 64a is formed to space the beginning of the nut threaded section 62a a distance "d" from the workpiece surface 37a where the workpieces 12a and 14a are of a minimum total thickness such that no threads on the opposite side of the breakneck groove 28a will be engaged by nut threaded section 62a. The distance "d" is equal to the length 55a of the pin shank 16a less the minimum total thickness of the workpieces 12a and 14a. In order to accomplish this, the length of the frangible pin shank portion 52a must be increased (relative to the length of portion 52 of FIGS. 1a-1c) such that its axial length will be equal to the dimension "d" plus at least one half of the length "1a" of the nut threaded section 62a.

Thus for installation of a fastener such as fastener 10a, the nut tool 56a is threaded onto the frangible pin shank portion 52a of the threaded pin shank section 26a. The pin 16a will be pulled into the sleeve 18a and the workpieces 12a and 14a pulled tightly together by rotation of the nut body 58a. After the pin 16a has been fully pulled into the expansion sleeve 18a, increased torque is continued to be applied to the nut body 58a until the axial load on the breakneck groove section 28a reaches the magnitude at which it is selected to fracture. Now the nut tool 56a is separated from the remainder of fastener 10a and the nut member 20a (similar to nut member 20 of FIGS. 1a-1c) can be applied to complete the installation. By simply removing the severed portion 52a, the nut tool 56a can be used again.

As noted the nut tool 56a is adapted to sever the threaded shank portion 52a at a substantially lower load than would be required if a swage action were to be performed as with swage type fasteners; see U.S. Pat. No. 3,025,730 issued to H. G. Brilmyer et al on Mar. 20, 1962 for "Driving Tool For Applying Torque Driven Lockbolt Fasteners".

Note that with the fastener and apparatus of FIGS. 2a-2d, the thread form on the frangible shank portion 52a need not be compatible with the thread form on the remainder of the threaded shank section 26a and in fact may be formed coarser to facilitate load transmission and reduce time in pulling the pin 16a for the expansion portion of the installation cycle. At the same time since relatively low axial loads are imposed at this portion of the installation cycle, the diameter of the frangible, disposable shank portion 52a can be reduced resulting in a cost savings in material. Such a fastener and apparatus is shown in FIG. 4 where components similar to like components in the embodiment of FIGS. 2a-2d have been given the same numeral designations with the addition of the letter postscript "b". For purposes of simplicity all such similar components have not been described again but are designated in the drawing of FIG. 4.

Thus in FIG. 4 the fastener 10b is identical to fastener 10a of FIGS. 2a-2d except that the frangible shank portion 52b is of a smaller diameter and has a coarser thread to facilitate the pulling action. Similarly, the nut tool 56b is identical to nut tool 56a except that the interally threaded section 62b is of a reduced diameter and thread form to accommodate the frangible shank portion 52b. After pulling the pin 16b into the sleeve 18b and severing the frangible shank portion 52b, a nut member such as nut member 20a can be applied to complete the installation.

Thus a unique fastener and method of installation have been provided for installing fasteners with an interference fit in openings in composite materials.

While it will be apparent that the preferred embodiments of the invention disclosed are well calculated to fulfill the objects above stated, it will be appreciated that the invention is susceptible to modification, variation and change without departing from the proper scope or fair meaning of the invention.

What is claimed is:

1. A fastener for securing together a plurality of workpieces of a composite type material and adapted to be located in aligned bores in such workpieces with a preselected interference fit and with the fastener adapted to secure such workpieces varying in total thickness from a preselected maximum to a preselected minimum total thickness, said fastener comprising:
   a pin member having an elongated shank and an enlarged head at one end,
   said pin member having an enlarged diameter smooth shank section adjacent said pin head,
   said pin member having a threaded section extending generally from said smooth shank section to the opposite end of said pin member,
   a breakneck groove section located within said threaded section to define a frangible portion at the free end of said threaded section,
   said breakneck groove section being the weakest section of said pin member and adapted to fracture at the preselected load of generally low magnitude,
   said threaded pin section having a maximum diameter less than the diameter of said smooth shank section,
   a thin gauged expansion sleeve having a tubular portion with an enlarged annular flange at one end,
   said sleeve having an inside diameter greater than said maximum diameter of said threaded pin section and less than the diameter of said smooth shank section;
   said tubular portion of said sleeve having a length no less than around the maximum total thickness of the workpieces, and having an outside diameter permitting assembly of said sleeve, with said pin member attached, into the workpiece bores, a nut member having a threaded nut section at one end and an enlarged head portion at its opposite end, said enlarged head portion having an enlarged counterbore having a diameter greater than the outside diameter of said tubular portion of said sleeve, said counterbore having an axial depth at least equal to the maximum extension of said sleeve tubular portion beyond the workpieces for workpieces of minimum total thickness, said threaded nut section having a preselected axial length, said frangible portion of said threaded section having an axial length no less than around one half of the axial length of said threaded nut section, said nut member having a preselected overall axial height, said pin member having the length of that portion of said pin shank from said pin head to said breakneck groove section being no greater than around the sum of the maximum total thickness of the workpieces, said preselected height of said nut member and the thickness of said sleeve flange, said threaded pin section being continuously threaded over its full length whereby said nut member can be threaded onto said threaded pin section and across said breakneck groove section past said frangible portion and onto that portion of said threaded section on the pin head side of said breakneck groove section, said frangible portion having a thread form adapted to be threadably gripped for applying a relative axial, pulling force between said pin member and said sleeve, said breakneck groove section having an axial strength at least equal to the maximum axial load required to pull said pin member fully into said sleeve with said smooth pin shank section expanding said sleeve into the workpiece bores to provide the preselected interference fit, the axial strength of said breakneck groove section being no greater than around twenty percent (20) greater than said maximum axial load whereby said frangible portion of said shank can be severed from said shank at a minimum axial load, and a flat washer means having a clearance fit on the end of the sleeve for engagement with the exposed face of the workpiece assembly, whereby the workpiece assembly faces are captively retained between the washer means and sleeve flange, said sleeve flange and flat washer means being adapted to non-rotatably engage the exposed faces of the workpiece assembly while the pin is being drawn into the sleeve, whereby said flange and washer inhibit delamination of the workpiece composite materials, said nut member being adapted to be torqued onto said pin member to pull said member into said sleeve to cause said radial expansion and to be continued to be torqued to apply the final desired clamp load.

2. A fastener for securing together a plurality of workpieces of a composite type material and adapted to be located in aligned bores in such workpieces with a preselected interference fit and with the fastener adapted to secure such workpieces varying in total thickness from a preselected maximum to a preselected minimum total thickness, said fastener comprising:

a pin member having an elongated shank and an enlarged head at one end, said pin member having an enlarged diameter smooth shank section adjacent said pin head, said pin member having a threaded section extending generally from said smooth shank section to the opposite end of said pin member, a breakneck groove section located within said threaded section to define a frangible portion at the free end of said threaded section, said breakneck groove section being the weakest section of said pin member and adapted to fracture at a preselected load of generally low magnitude, said threaded pin section having a maximum diameter less than the diameter of said smooth shank section, a thin gauged expansion sleeve having a tubular portion with an enlarged annular flange at one end, said sleeve having an inside diameter greater than said maximum diameter of said threaded pin section and less than the diameter of said smooth shank section, said tubular portion of said sleeve having a length no less than around the maximum total thickness of the workpieces, and having an outside diameter permitting assembly of said sleeve, with said pin member attached, into the workpiece bores, a nut member having a threaded nut section at one end and an enlarged head portion at its opposite end, said enlarged head portion having an enlarged counterbore having a diameter greater than the outside diameter of said tubular portion of said sleeve, said counterbore having an axial depth at least equal to the maximum extension of said sleeve tubular portion beyond the workpieces for workpieces of minimum total thickness, said threaded nut section having a preselected axial length, said frangible portion of said threaded section having an axial length no less than around one half of the axial length of said threaded nut section, said nut member having a preselected overall axial height, said pin member having the length of that portion of said pin shank from said pin head to said breakneck groove section being no greater than around the sum of the maximum total thickness of the workpieces, said preselected height of said nut member and the thickness of said sleeve flange, said threaded nut section of said nut member having threads formed for threaded engagement onto that portion of said threaded section on the pin head side of said breakneck groove section, said frangible portion having a thread form adapted to be threadably gripped for applying a relative axial, pulling force between said pin member and said sleeve, said breakneck groove section having an axial strength at least equal to the maximum axial load required to pull said pin member fully into said sleeve with said smooth pin shank section expanding said sleeve into the workpiece bores to provide the preselected interference fit, said breakneck groove section having an axial strength no greater than around twenty percent (20%) greater than said maximum axial load whereby said frangible portion of said shank can be severed from said shank at a minimum axial load, and a flat washer means having a clearance fit on the end of the sleeve for engagement with the exposed face of the workpiece assembly, whereby the workpiece assembly faces are captively retained between the washer means and sleeve flange, said sleeve flange and flat washer means being adapted to non-rotatably engage the exposed faces of the workpiece assembly while the pin is being drawn into the sleeve, whereby said flange and washer inhibit delamination of the workpiece composite materials, said nut member being adapted to be torqued onto said pin member to pull said pin member into said sleeve to cause said radial expansion and to be continued to be torqued to apply the final desired clamp load.

3. The fastener of claim 2 with said breakneck groove section having a tensile fracture load of no greater than around fifty percent (50%) of the final tensile load to be applied by said nut member at final clamp up thereby facilitating the removal of said frangible portion of said shank at said breakneck groove section at a minimum tensile load.

4. In association with a workpiece assembly comprising facially-engaged composite material workpieces having aligned holes therethrough defining an annular hole surface:

the improvement comprising a sleeve-expansion pin having an enlarged head, a smooth-surfaced shank section, and threaded shank section;

a freely-movable sleeve having a radial flange at one end, and a length that enables its other end to extend beyond an exposed face of the workpiece assembly when said sleeve is slidably inserted into the aligned holes in the workpiece assembly;

an annular flat washer having a clearance fit on the end of the sleeve and being in engagement with the exposed face of the workpiece assembly, whereby the workpiece assembly faces are captively retained between the washer and sleeve flange, and a rotatable nut member threadable onto the threaded section of the pin to draw the pin into the sleeve;

the diameter of the smooth-surfaced shank section of the pin being slightly greater than the freely-movable sleeve internal diameter, whereby when the pin is drawn rectilinearly into the sleeve said sleeve is expanded into an interference fit with the annular hole surface;

said sleeve flange and said flat washer means being adapted to non-rotatably engage the exposed faces of the workpiece assembly while the pin is being drawn into the sleeve, whereby said flange and washer inhibit delamination of the workpiece composite material; and a breakneck groove formed in the threaded section of the pin to define a breakneck groove section, whereby an exposed section of the pin can be removed after the pin has been fully drawn into the sleeve, the axial strength of said breakneck groove section being no greater than around twenty percent (20%) greater than said maximum axial load twenty said frangible portion of said shank can be severed from said shank at a minimum axial load.

* * * * *

UNITED STATES PATENT AND TRADEMARK OFFICE
CERTIFICATE OF CORRECTION

PATENT NO.   : 4,850,771
DATED        : July 25, 1989
INVENTOR(S)  : Ramon L. Hurd It is certified that error appears in the above-identified patent and that said Letters Patent is hereby corrected as shown below:

| | | | |
|---|---|---|---|
| Column 3, | Line 33, | | After "groove" insert --section--; |
| Column 4, | Line 15, | | "enlarger" should be --enlarged--; |
| Column 5, | Line 42, | | "section" should be --sections--; |
| Column 7, | Line 20, | | After "delamination" insert --as-- |
| Column 9, | Line 42, | Claim 1, | "(20)" should be --(20%)--; |
| Column 12, | Line 29, | Claim 4, | "twenty" should be --whereby--. |

The title should read:

" THREADED FASTENER FOR SECURING WORKPIECES OF COMPOSITE MATERIAL"

Signed and Sealed this

Twelfth Day of February, 1991

*Attest:*

HARRY F. MANBECK, JR.

*Attesting Officer*   *Commissioner of Patents and Trademarks*